United States Patent [19]

Filliman

[11] Patent Number: 4,595,951

[45] Date of Patent: Jun. 17, 1986

[54] TELETEXT DECODER USING A COMMON MEMORY

[75] Inventor: Paul D. Filliman, Indianapolis, Ind.

[73] Assignee: RCA Corporation, Princeton, N.J.

[21] Appl. No.: 556,353

[22] Filed: Nov. 29, 1983

[51] Int. Cl.[4] ......................... H04N 7/087; H04N 7/08

[52] U.S. Cl. .................................... 358/147; 358/142; 358/146

[58] Field of Search ............... 358/141, 142, 146, 147, 358/181, 903; 364/200, 900

[56] References Cited

U.S. PATENT DOCUMENTS 4,161,728 7/1979 Insam ................................. 358/147

4,388,639 6/1983 Cox et al. ............................ 358/147

4,393,404 7/1983 Cox et al. ............................ 358/147

OTHER PUBLICATIONS

A B.B.C. Research Department Report, No. BBC RD 1983/7, entitled Enhanced UK Teletext: Experimental Equipment for High-Quality Picture Coding and Other Enhancements, in the name of J. L. Riley, dated Jul. 1983.

Article by P. Frandon and G. Chauvel entitled, "Antiope LSI," published in IEEE Transactions on Consumer Electronics, vol. C-25, No. 3, Jul. 1979, pp. 334-338.

*Primary Examiner*—Tommy P. Chin

*Assistant Examiner*—Michael D. Parker

*Attorney, Agent, or Firm*—Eugene M. Whitacre; Joseph J. Laks; Sammy S. Henig

[57] ABSTRACT

A teletext decoder extracts digital information from a video signal for displaying graphics and textual information embedded in the video signal. The decoder includes a prefix processor responding to user supplied commands for selecting and storing the pertinent embedded information. The decoder includes a common memory for storing the digital words provided by the prefix processor and a microcomputer capable of reading from and writing to the common memory. The microcomputer reads the data provided by the prefix processor, converts it to digital words representing the picture elements and stores the converted digital words in the common memory. The decoder includes a display processor which reads the converted digital words from the common memory to drive an image display device.

8 Claims, 5 Drawing Figures

TELETEXT DECODER USING A COMMON MEMORY

BACKGROUND OF THE INVENTION

This invention relates to a teletext decoder employing a common memory for storing the teletext incoming data blocks. The same memory is also time-shared by a microcomputer and by a display processor displaying the information stored in the memory.

Teletext is a general term for a television-based communication technique. A horizontal line may be utilized for broadcasting textual and graphical information encoded in a digital binary representation. Teletext may be sent during the vertical blanking interval, when no other picture information is sent. The teletext binary information includes control and display digital information serially organized in data blocks. The organization of the binary information in the broadcasted signal is determined by the standard employed by the broadcaster. By way of an example only, references are made here to the proposed NABTS (North American Broadcast Teletext Specification).

In the NABTS each horizontal line containing teletext data is referred to as a packet. The binary data is divided into bytes; each byte includes eight binary units (bits). The first eight bytes of each packet are collectively known as the packet header. Three bytes of the packet header define the channel number and each channel is organized into pages. Each page is made up of a number of packets.

After its reception by the television receiver, the digital data included in the video signal is processed by the teletext decoder. Then the digital data is extracted from the video signal by a data slicer providing a stream of bits to a data processor (sometimes referred to as the prefix processor). The data processor may be made to receive user-initiated commands specifying the desired information for display. The data processor buffers in a memory the data contained in the teletext channel selected for displaying. The buffered data is processed and provided to a display processor which outputs the displaying signals. When a television picture tube (CRT) is used as an image displaying device, the display processor has to output the displaying signals periodically for maintaining the image on the television screen.

One feature of the invention is the usage of a microcomputer to control the data processor for selecting the information to be stored in the memory. The microcomputer issues control signals in response to a user-initiated command. The microcomputer also performs the required data processing of the buffered data by reading the memory to obtain the buffered data, by performing the required operations on it and by storing the processed data in the same memory, but not necessarily in the same locations where the buffered data reside. The microcomputer also uses the same memory for storage and retrieval of intermediate results and of status information.

Another feature of this invention is the usage of a time-shared common memory for buffering the incoming data, for providing a work space for the microcomputer and for providing access to the display processor. Because only one memory is used, a simplified interconnection is achieved. This lends to a cost effective utilization of the storage space required by the teletext decoder.

Another feature of the invention is a timing unit which provides the timing signals to operate the microcomputer, the data processor and the display processor and to operate a switching means which provides access to the common memory for each of the microcomputer, the data processor and the display processor. The timing unit makes the memory available for access, as required by the display processor, the microcomputer and the data processor.

The timing unit defines consecutively recurring time slots. The time slots occur in a predetermined regular time interval. An access to the common memory is accomplished by providing an address word to the memory and by transferring a data word either to or from the location defined by the address word. The timing unit may provide an access to the common memory during the time slot and only one access may occur in each time slot. The presence of sequence of consecutive time slots may be independent of real time operations in the microcomputer, the data processor and the display processor; so that if the data processor, for example, requires an access to the common memory, its access timing has to "fit" the predetermined timings of the time slot. The assignment of each time slot to the data processor, the microcomputer or the display processor, may be under the control of the timing unit.

In the prior art, access to memory occurs in response to a request by a device such as the microcomputer. Therefore, a device having a higher priority may have to wait until the access of a lower priority device such as the microcomputer is completed before it obtains access to the common memory.

As a feature of the decoder of the invention, the timing unit allocates a predetermined order of time slots for the exclusive usage of the display processor. The timing unit provides the timing signals to the display processor such that its timings for access coincide with the time slots allocated exclusively for its usage.

Another feature of the invention is the arrangement in which a digital word stored in the common memory for the display processor includes more than one pixel word. A pixel word provides information to the display processor for displaying one picture element called pixel. The display processor reads the pixel words included in the digital word during the display processor access time slot.

In accordance with one aspect of the invention, an unallocated time slot is given according to a priority scheme. Simultaneous requests for an access to the common memory are handled by the priority scheme which determines the assignment of each time slot prior to the beginning of that time slot. Therefore, the arbitration in this decoder is accomplished synchronously with those time slots not preassigned to the display processor.

SUMMARY OF THE INVENTION

A decoder of teletext-like signals containing picture information comprises a data processor for obtaining a digital message received from the teletext-like signals. A common memory is used for storing the digital message for further processing by a microcomputer. The microcomputer reads the stored data, processes it and stores it in the common memory. A display processor reads the processed data from the common memory and generates driving signals for a displaying device. A switch directs data between the common memory and each of the microcomputer, data processor and display processor. The switch operates under the control of a timing unit. The timing unit makes the memory available for access as required by the microcomputer, the data processor and the display processor.

DESCRIPTION OF THE INVENTION

Figure 1:
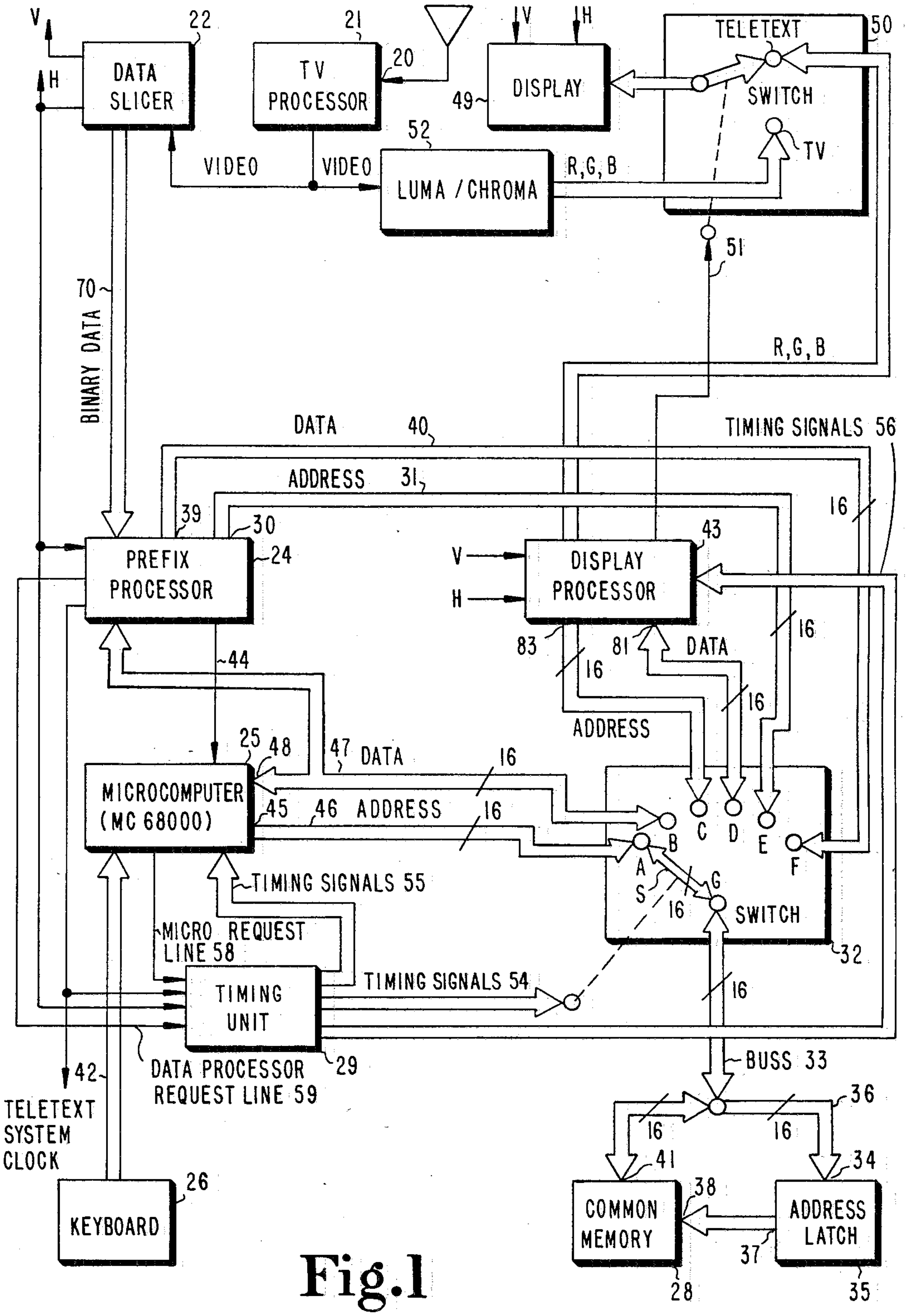
FIG. 1 illustrates a teletext decoder embodying the invention.

The teletext decoder in FIG. 1, which embodies the invention, receives a video-modulated signal at input 20 of a television processor 21. Processor 21 includes such well known television receiver stages as the tuner, the intermediate frequency amplifier and the video detector. Data slicer 22 receives the detected video from television processer 21 for detection and separation of the teletext binary data. Data slicer 22 generates horizontal and vertical sync signals along signal lines H and V respectively synchronized to the incoming composite video signal. Data slicer 22 provides a serial data stream and a reconstituted clock on lines 70 to a data processor 24 such as the conventional prefix processor of a teletext decoder. The reconstituted clock is used to synchronize the teletext system clock developed by data processor 24 and distributed to various stages within the decoder.

User-initiated commands are coupled to data processor 24 by a microcomputer 25. By operating a keyboard 26, the user selects the magazine and page number to be displayed. Microcomputer 25 receives the user selected data from keyboard 26 along a signal line 42 and issues a 12 bit word to data processor 24 on select lines 27. This word signifies the required NABTS defined packet address.

After the occurrence of horizontal sync, the data processor begins searching for the presence of the NABTS-defined framing code in the serial data stream received from data slicer 22. If a valid framing code occurs, data processor 24 begins packing the serial data stream into 8 bit units called bytes. Data processor 24 processes the next 3 bytes to obtain the packet address. Microcomputer 25 provides a 12 bit word to data processor 24 on lines 47 for specifying the required packet address. When a match accurs between the required packet address and the packet address of the incoming teletext data, data processor 24 begins the transfer of all the subsequent bytes included in the NABTS-defined data packets to a common memory 28 of the teletext decoder at time slots controlled by a timing unit 29.

Data words are transferred to memory 28 from data processor 24 using a two-step process. In the first step, an address word is transferred from an address port 30 of data processor 24 on lines 31 to a port E of a switch 32. A timing unit 29 provides timing signals 54 to control switch 32 to move switch lines S to contact port E for transferring the address words to a buss 33 by way of a port G. Buss 33 may be made of 16 lines to define a 16 bit buss. From buss 33 the address word is transferred on lines 36 to an input port 34 of an address latch 35. The address word is stored in address latch 35, and an output port 37 transfers the stored address word to a memory address port 38 for selecting the location in memory 28 to which the transfer of the teletext word is directed.

In the second step, a data word is transferred on lines 40 from a port 39 of data processor 24 to a port F of switch 32. Timing unit 29 controls switch lines S of switch 32 for transferring the data to the same buss 33. Buss 33 directs the data to memory data port 41. The data word is then stored in memory 28 in the location selected by the stored address word of address latch 35.

A data word transferred to a memory location while applying a certain memory address, may be transferred from the same location by applying the same address at a later time.

Figure 3A:
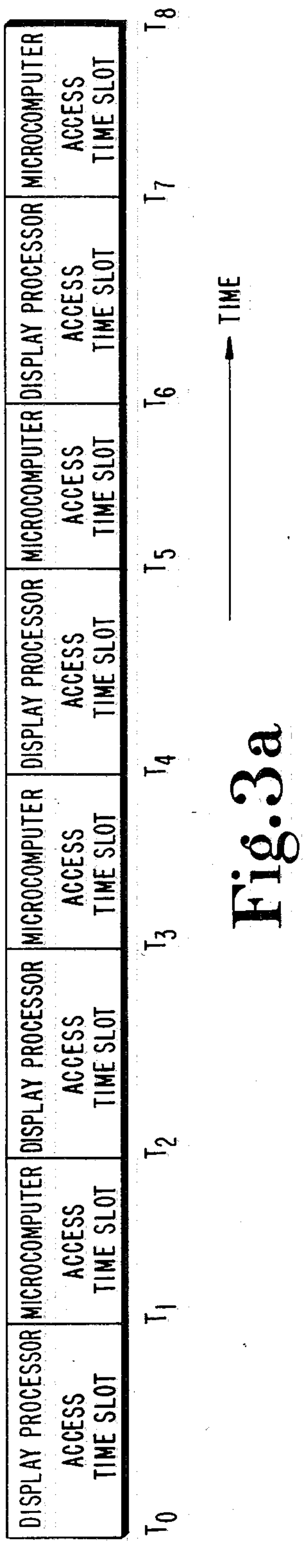
FIGS. 3*a*, 3*b* are diagrams of the utilization of the common memory in various time slots.
Figure 3B:
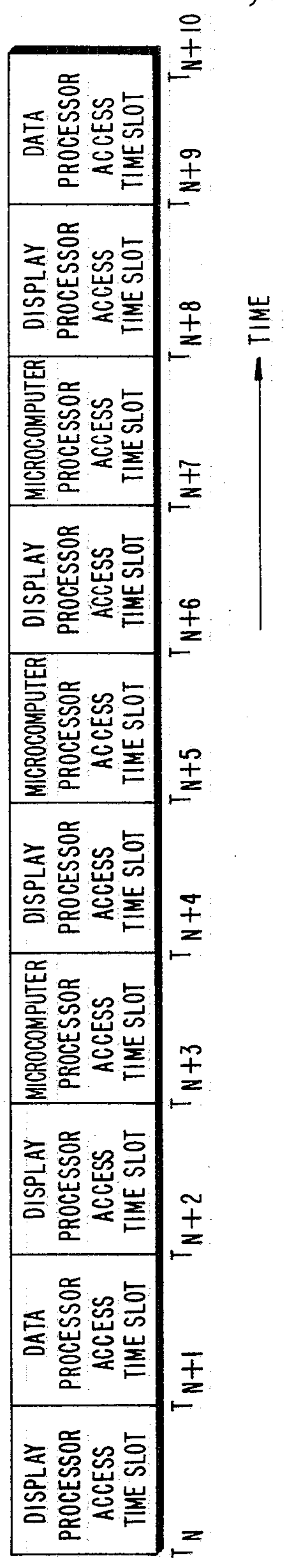

Common memory 28 is time-shared by microcomputer 25, data processor 24 and a display processor 43. Time sharing of common memory 28 is accomplished by timing unit 29. Timing unit 29 assigns a time slot for each access to common memory 28. FIGS. 3*a* and 3*b* illustrate the assignment of time slots for the decoder described in in FIG. 1. Each time slot for the decoder described in FIG. 1 has a duration of 349 nanoseconds.

The two-step process in which a data word is transferred through switch 32 is accomplished in a time slot. An access to common memory 28 by data processor 24 defines the data processor access time slot. Likewise, such an access by display data processor 43 defines the display processor access time slot, and such an access by microcomputer 25 defines the microcomputer access time slot. The time slots are implemented in a nonoverlapping manner, such that only one of microcomputer 25, display processor 43 and data processor 24 may perform an access to common memory 28 at any time slot. An access to common memory 28 is accomplished by transferring digital words through switch 32. When switch 32 provides access to commom memory 28 for one of data processor 24, microcomputer 25 and display processor 43, it excludes the other two from access to common memory 28.

Timing unit 29 provides timing signals 54 to control switch 32, timing signals 55 to control the timing in microcomputer 25 and timing signals 56 to control the timing in display process 43. By means of these timing signals timing unit 29 assigns every other time slot for access to memory 28 by display processor 43. The alternate time slots not assigned for such access, may be assigned by timing unit 29 to either microcomputer 25 or data processor 24. The decision to assign a time slot to either microcomputer 25 or data processor 24 depends on the status of both at a time determined by timing unit 29. If data processor 24 is ready to perform a data transfer to common memory 28 in a time slot not assigned to display processor 43, timing unit 29 may provide this time slot to data processor 24 for obtaining access to common memory 28. If data processor 24 is not ready to perform a data transfer to common memory 28 in a time slot not assigned to display processor 43, timing unit 29 may provide this time slot to microcomputer 25 for obtaining access to memory 28, provided that microcomputer 25 is ready to perform a transfer in such time slot. Request lines 59 and 58 respectively indicate to timing unit 29 that data processor 24 and microcomputer 25 require an access to common memory 28.

By using predetermined time slots, it is possible to provide access to common memory 28 in an efficient manner. Each time slot lasts a sufficient period of time to obtain access to common memory 28 using the two-step process. Because display processor 43 obtains an access to memory 28 once every two time slots, it is guaranteed that it receives the required display information at a sufficiently rapid rate to display each picture element at the appropriate place on the scan line.

The two-step process for the teletext data access is illustrated in FIG. 3*b* as taking place in an access time slot between time $T_{n+1}$ and time $T_{n+2}$ and also in an access time slot between time $T_{n+9}$ and time $T_{n+10}$. Data processor 24 packs 2 bytes of incoming teletext data for storing it in memory 28. As illustrated in FIG. 3*b*, this occurs once every eight access time slots so that 2 bytes of data may be loaded to memory 28 every 2.8 microseconds, which is the rate for data received in the NABTS system.

From the time data processor 24 collects 2 bytes of teletext data for storing one data word in common memory 28, until the next byte is obtained, a data processor access time slot is guaranteed to occur, as may be deduced from FIG. 3*b*. Therefore, data processor 24 is not required to buffer more than one data word. This aspect of data processor 24 simplifies the design of data processor 24.

Data processor 24 stores each subsequent data word in a consecutive memory address. In doing so, it creates a data processor buffer 201 as illustrated in the schematic arrangement in FIG. 2 of common memory 28 of FIG. 1. This data buffer may be read by microcomputer 25 for further processing, as explained later on. By reading lines 47 microcomputer 25 may ascertain the number of data words transferred by data processor 24 to common memory 28. Line 44 is used to select A data transfer on line 47 to or from data processor 24.

As illustrated in FIG. 3*a* and FIG. 3*b*, microcomputer 25 access to memory 28 occurs at time slots occupied by neither data processor 24 nor display processor 43. Microcomputer 25 reads data processor buffer 201, located in memory 28, and transfers its contents to a different group of locations, a page storage buffer 202 of FIG. 2 in common memory 28 of FIG. 1.

Page storage buffer 202 is used for storing the teletext data corresponding to the most likely pages the user may request. For example, the preceding page is likely to be requested by the user. By storing it in buffer 202, the decoder may provide quick response to a user for the preceding page because the preceding page is already stored in buffer 202 at the time the user initiates such request.

Figure 2:
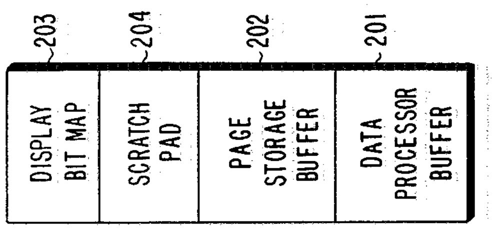
FIG. 2 illustrates an example of memory storage allocation for the common memory of FIG. 1.

After transferring the teletext data of data processor buffer 201 to page storage buffer 202, microcomputer 25 processes page storage buffer 202 and stores the results in a different set of locations in common memory 28 called a display bit map 203, illustrated in FIG. 2.

Because microcomputer 25 is, in effect, a general purpose microcomputer, it may perform tasks unrelated to teletext signal decoding. For example, it may be made for controlling the local keyboard. To perform these tasks, microcomputer 25 may use a scratch-pad 204 storage space of memory 28, as illustrated in FIG. 2.

The actual data word transfer between microcomputer 25 and memory 28 is also performed by a two-step process. In the first step, an address word is transferred from an address port 45 of microcomputer 25 on lines 46 to a port A of switch 32. Timing unit 29 controls switch 32 for transferring the address word to buss 33. From buss 33 the address word is transferred on lines 36 to input port 34 of address latch 35. The address word is stored in address latch 35. Output port 37 transfers the stored address word to memory address port 38 for selecting the location in memory 28 to which the transfer of the teletext word is directed.

In the second step, microcomputer 25 performs either a transfer to or a transfer from memory 28. If a transfer to memory is required, a data word is transferred on lines 47 from a data port 48 of microcomputer 25 to a port B of switch 32. Timing unit 29 controls switch 32 for transferring the data word to buss 33. Buss 33 directs the data to memory data port 41. The data word is then stored in memory 28 in the location selected by the stored address word of address latch 35.

On the other hand, if a transfer from memory 28 to microcomputer 25 is required, a data word is transferred from memory data port 41 to buss 33 and from there to port B of switch 32 under the control of timing unit 29. From port B of switch 32, the data word is transferred on lines 47 to microcomputer data port 48.

As may be inferred from the previous discussion, FIG. 3*a* illustrates the access time slots of transfers from microcomputer 25 to memory 28 in a situation where teletext data is not transferred by data processor 24 to data processing buffer 201. In this case, alternate time s]ots are allocated to microcomputer 25. However, it may happen that microcomputer 25 will attempt to address memory 28 at a time not assigned for microcomputer 25 data access. When this happens, microcomputer 25 is held at a wait state until the next available microcomputer 25 data access time slot. Microcomputer MC68000, made by Motorola Inc., Phoenix, Arizona, for example, has a built-in capability to enter such a wait state in response to an appropriate input signal.

FIG. 3*b* illustrates microprocessor access time slots to memory 28 in a situation where teletext data is being transferred by data processor 24. In this case, microcomputer 25 is assigned only those time slots that are assigned neither to display data access nor to teletext data access. A display data access time slot is assigned every alternate access time slot and a teletext data access time slot is assigned one time slot in every eight access time slots.

In a situation when data processor 24 is performing an access to common memory 28, microcomputer 25 has to wait its turn for access when a data processor access time slot is given priority. Except for such a waiting time caused by the priority given to data processor 24, microcomputer 25 continues to operate without waiting delays.

The concept of preassigning alternate time slots for display processor 43 and allocating the remaining time slots for data processor 24 and microcomputer 25, as carried out by timing unit 29, results in an efficient sharing of common memory 28 and a teletext decoder that is capable of fast processing of full field teletext data.

The transfer of a data word from common memory 28 to display processor 43 is similar to the transfer to microcomputer 25 from common memory 28. In this case, as illustrated in FIG. 1, an address word is provided from an address port 83 of display processor 43 and the data word is received at a data port 81. The address word is coupled to a port C of switch 32 and the data word is coupled from a port D. Timing signals 56 from timing unit 29 provide timing signals to control operation of display processor 43. Data transfer is performed in a similar way to the two-step process employed for transferring a data word from common memory 28 to microcomputer 25. An access to common memory 28 requires the two-step process for the embodiments of FIG. 1 because buss 33 is used for transferring both address and data words. It may be understood that the access operation accomplished by the two-step process may also be accomplished by a one-step process in other variations where address words and data words are provided to a common memory on separate busses.

Timing unit 29 provides display processor 43 with the highest priority for obtaining access to memory 28 in that it provides a 349 nanosecond display processor access time slot in every period of 698 nanoseconds irrespective of the status of microcomputer 25 and data processor 24. Furthermore, as explained before, a time slot not used by display processor 43 is given to data processor 24 if it has a data word ready for transfer, and to microcomputer 25 if data processor 24 does not require a transfer to memory 28.

Display processor 43 of FIG. 1 reads 4 pixel data words each time it is provided with an access to common memory 28. Each pixel word includes 4 binary bits. Therefore, a 16-bit wide memory word is used to provide the 4 pixel words over a 16-bit bus 33 in one access time slot. Display processor 43, in the embodiment of FIG. 1, is provided with an access to common memory 28 in alternate time slots from the sequence of consecutive time slots provided by timing unit 29.

Display processor 43 may be required to provide display 49 with pixel information at a sufficiently rapid rate for display in display 49. In accordance with one aspect of the invention, the capability of rapid rate display is obtained by having display processor 43 fetch or read a plurality of pixel data words in each access to common memory 28. Illustratively, it may read 4 pixel words included in each memory word.

Display processor 43 translates each 4-bit pixel word to a color code, illustratively comprising 3 groups of 3 bits to a group and a transparency code, illustratively comprising one bit. The groups of the color code determine the value of separate red, green and blue analog signals respectively. These three analog signals are coupled to a port TELETEXT of a switch 50. A second port TV of switch 50 provides a different set of red, green and blue signals provided by a luma/chroma stage 52, of conventional design, 52 which receives the video signal from television processor 21.

Switch 50 couples the signals from its port TELETEXT. Alternately, it couples the signals from its port TV, according to the digital code of the transparency code translated for the pixel. Therefore, the transparency code associated with a pixel word causes, according to its digital code, that display 49 displays either teletext information from display processor 43 or, alternatively, other video information such as the conventional television picture from television processor 21. This capability of the transparency code may be of use, for example, in captioning. An advantageous way of processing pixel color codes and the transparency code is described in U.S. patent application Ser. No. RCA 80,484, Ser. No. 556,352, by P. D. Filliman, entitled A TELETEXT DECODER HAVING A REGISTER ARRAY FOR OPERATING ON PIXEL WORDS, concurrently filed herewith and hereby incorporated by reference.

Figure 4:
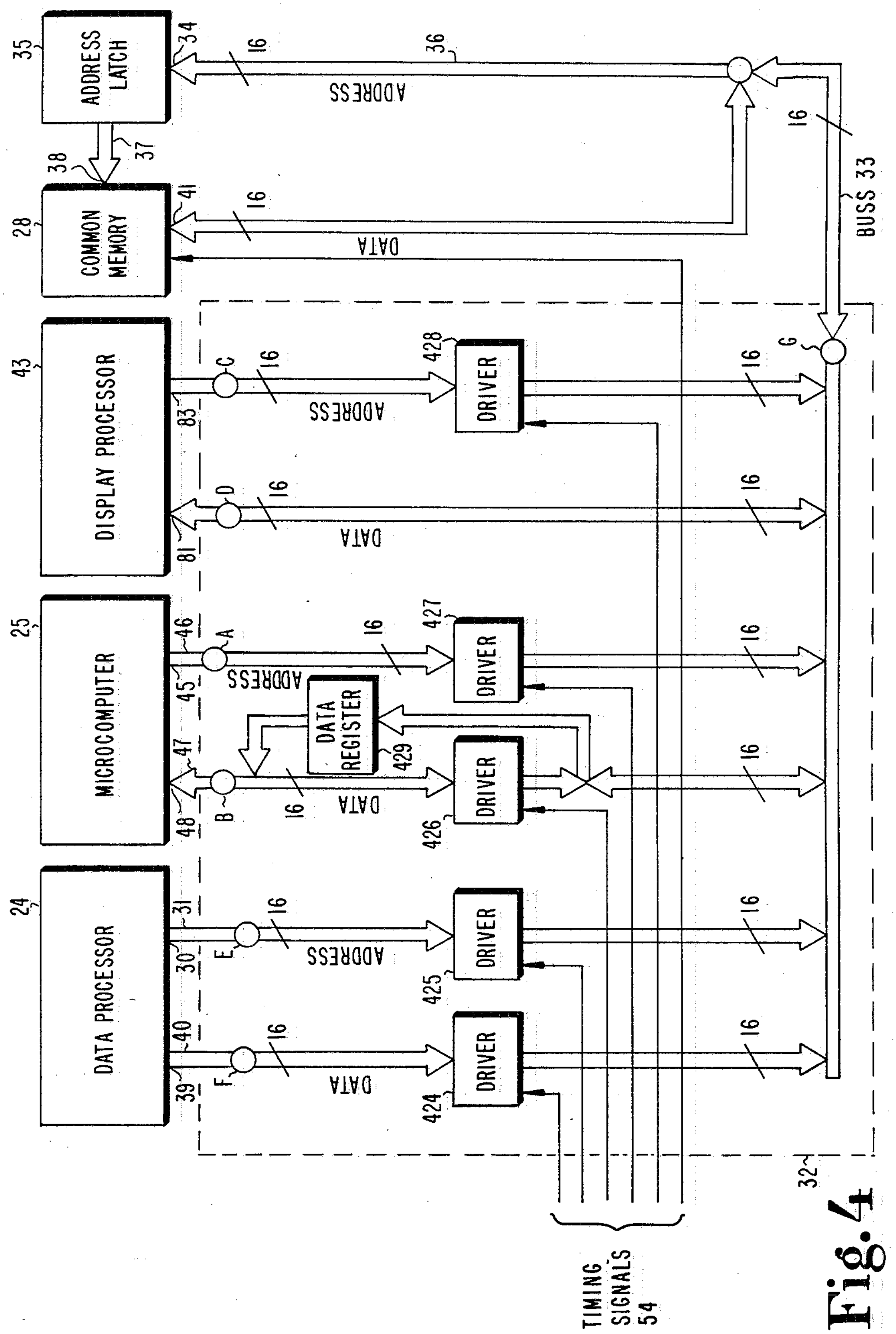
FIG. 4 illustrates an embodiment of a switch used in the decoder of FIG. 1.

Switch 32, illustrated in FIG. 1, may also be implemented using a buss approach as illustrated in FIG. 4. In FIG. 1 and FIG. 4, identical numbers identify the same functions. The circuit included within the dashed-line in FIG. 4 represents switch 32. A driver 424, 425, 426, 427 or 428 may drive buss 33 under the control of timing signals 54 of timing unit 29. Timing unit 29 provides that only one driver drives buss 33 at a time to obtain a valid transfer of a digital word.

If a digital word transferred across buss 33 has to stay on it for a shorter period of time than required by the receiving device, a storage element such as a data register 429, illustrated in FIG. 4, should be introduced to save the transferred digital word until the the device is ready to read the word. Such configuration may be used for reading a data word to microcomputer 25. Using this approach, it is possible to allocate a shorter time slot for transferring digital words across buss 33 than in a situation where switch 32 has to stay in the same position until microcomputer 25 reads the data word.

What is claimed is:

1. A decoder of teletext-like signals containing picture information for displaying by an imaging device, comprising:

- a data processor responsive to said teletext-like signals for generating binary data therefrom;
- a display processor for producing signals for said imaging device that contain said picture information;
- a microcomputer responsive to said binary data for controlling operation of said display processor;
- a memory for storing said binary data;
- switching means for providing access to said memory for each of said data processor, display processor and microcomputer to transfer data therebetween, said switching means, when providing access to said memory for one of the data processor, display processor and microcomputer, exclusing the other two from access thereto; and
- a timing unit for providing timing signals to control said switching means, said timing signals defining a recurring first access time slot wherein access to said memory is provided for said display processor, a recurring second access time slot wherein access to said memory is provided for said microcomputer and a recurring third access time slot wherein access to said memory is provided for said data processor, with the access time slots for said display processor being provided at predetermined time intervals.

2. A decoder as described in claim 1, wherein said data processor access time slot has a higher priority over said microcomputer access time slot when both are ready to transfer data to said memory.

3. A decoded of teletext-like signals containing picture information for displaying by an imaging device, comprising:

- a data processor responsive to said teletext-like signals for generating binary data therefrom;
- a display processor for producing signals for said imaging device that contain said picture information;
- a microcomputer responsive to said binary data for controlling operation of said display processor:
- a memory for storing said binary data;
- switching means for providing access to said memory for each of said data processor, display processor and microcomputer to transfer data therebetween, said switching means, when providing access to said memory for one of the data processor, display processor and microcomputer, excluding the other two form access thereto; and a timing unit for providing timing signals to control said switching means, said timing signals defining a sequence of access time slots to said memory that occur at regular intervals.

4. A decoder as recited in claim 3, further comprising a data storage register for receiving the data transferred from said memory, said register allowing said microcomputer to read said transferred data at a later time so that said switching means is free to perform a subsequent access to said memory after said data storage register receives said data transferred from said memory.

5. A decoder as recited in claim 3, wherein said switching means comprises a buss coupled to said memory and having a plurality of signal lines and a plurality of data drivers for driving said buss, said data drivers receiving at input ports thereof, respectively, address and data words from each of said microcomputer and data processor, and address words from said display processor for driving the corresponding address and data words on said buss at a particular time slot assigned to each of said data drivers, so that only one data driver is capable of driving said buss at any one time.

6. A decoder as recited in claim 3 wherein said data processor is given priority over said microcomputer for access to said memory in a time slot not otherwise assigned to said display processor.

7. A decoder as recited in claim 3 wherein said display processor is capable of reading a plurality of pixel data words each time said display processor is provided the access to said memory.

8. A decoder for teletext-like digital signals comprising:

a data processor receiving the teletext-like signals for extracting control and picture digital information therefrom;

a microcomputer for controlling the operation of the data processor;

a display processor for supplying picture information, that is derived from the picture digital information in such a way that the derived picture information is capable of being displayed in a display, each of said data processor, microcomputer and display processor, having a port for transferring a digital word thereon;

a memory having an address port, a data port for transferring data into and out of the memory and a plurality of memory locations;

first means having an input port for receiving said digital word that contains a memory address word, and having an output port for coupling the received memory address word that is received at said input port of said first means to the memory address port;

switching means for selectively transferring a digital word to the input port of the first means, the switching means being capable of selectively transferring a digital word from the microcomputer and from the data processor to a memory location, and a digital word from a memory location to the microcomputer and to the display processor, the memory location being determined by the memory address which is being provided by the output port of the first means at the time a transfer takes place, so that the data word transferred from the microprocessor or the data processor to a memory location while applying a certain memory address at any one time can be transferred at a later time to the microcomputer or to the display processor from the same memory location by applying the same certain memory address; and a timing unit providing timing signals to control said switching means, said timing signals defining a sequence of access time slots to said memory that occur at regular intervals.

* * * * *